Dec. 20, 1955    R. W. BRADLEY ET AL    2,727,560
APPARATUS FOR DIELECTRIC BONDING
Original Filed July 8, 1948    5 Sheets-Sheet 1
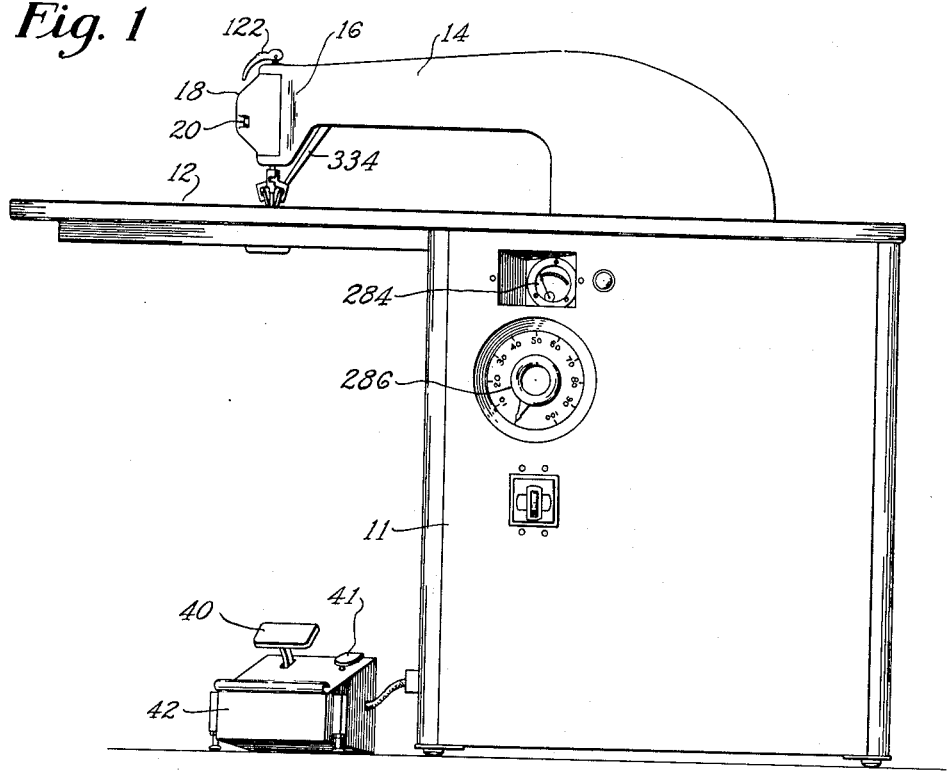
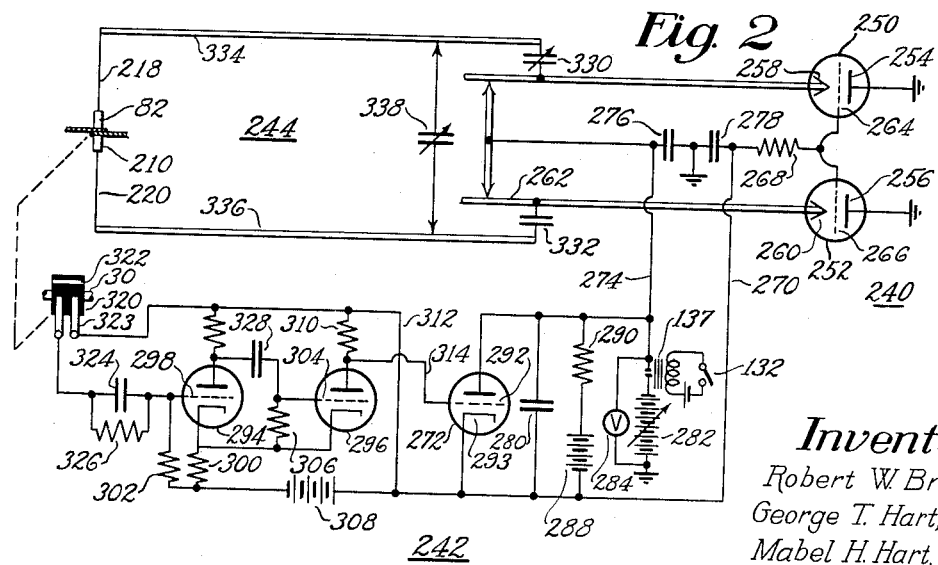
Inventors
Robert W. Bradley
George T. Hart, Dec'd
Mabel H. Hart, Admx.
By their Attorney

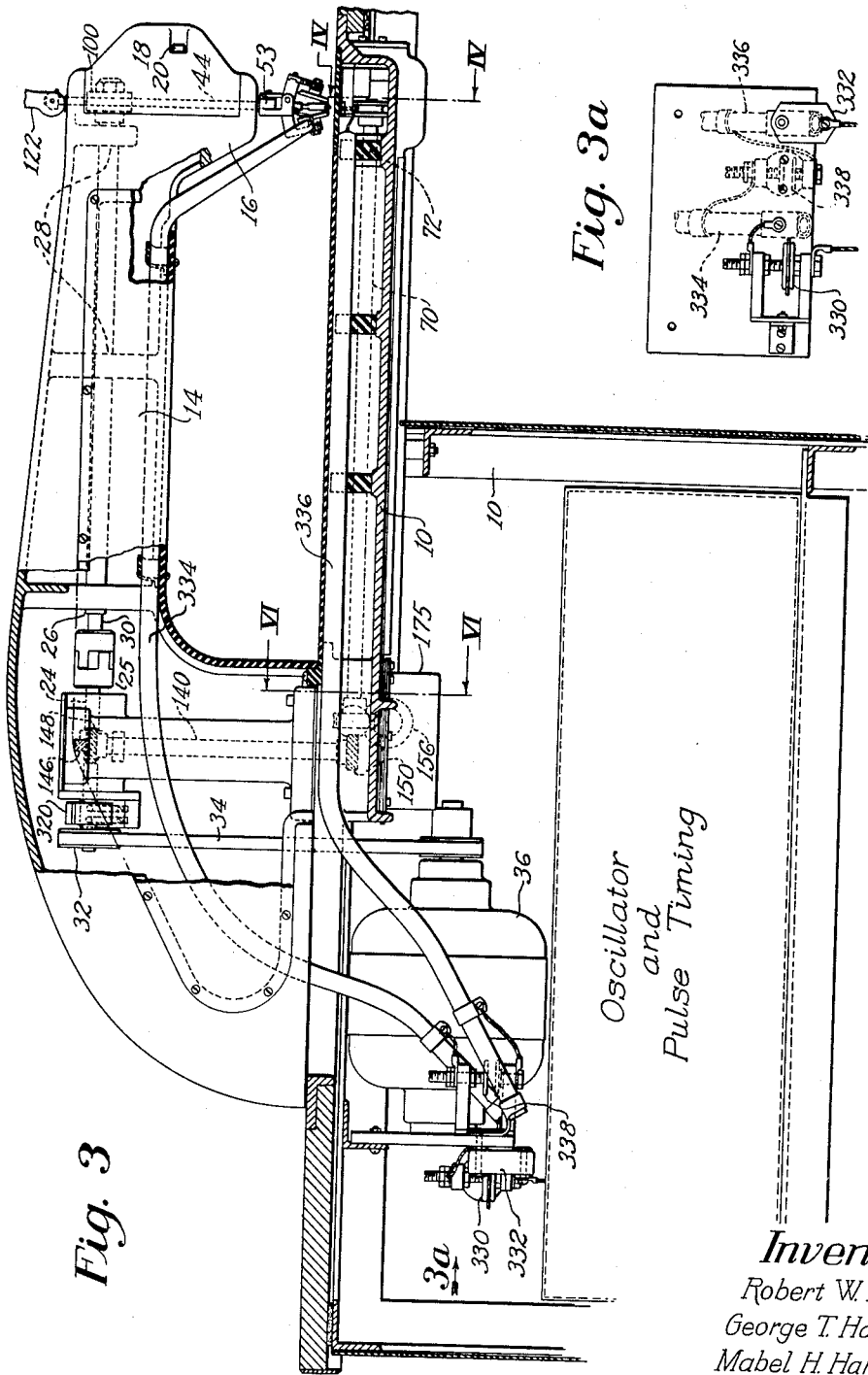

Dec. 20, 1955  R. W. BRADLEY ET AL  2,727,560
APPARATUS FOR DIELECTRIC BONDING
Original Filed July 8, 1948  5 Sheets-Sheet 3
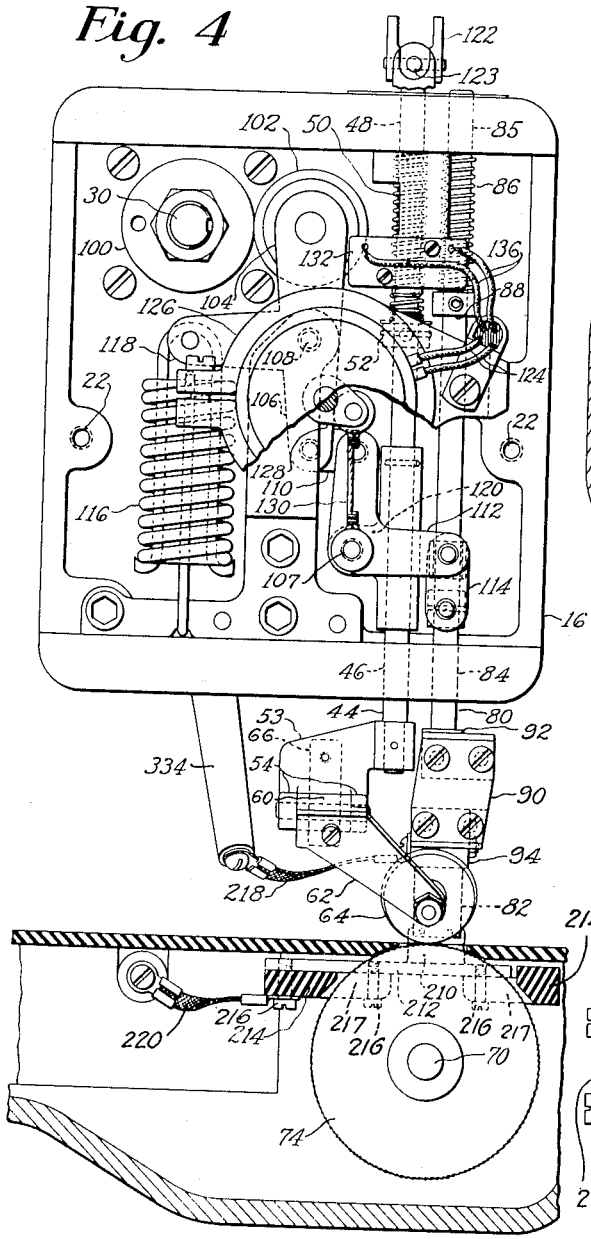
Fig. 4
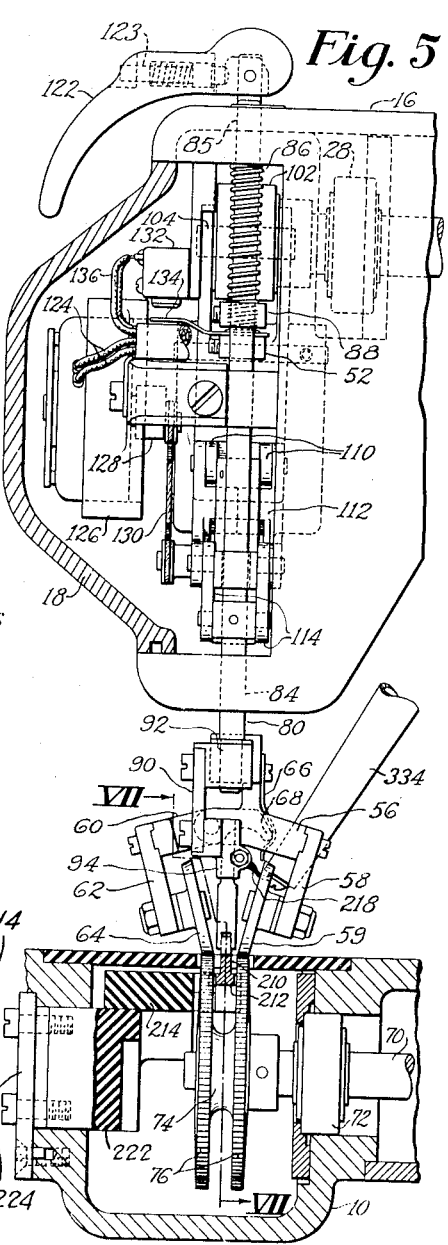
Fig. 5
Inventors
Robert W. Bradley
George T. Hart, Dec'd
Mabel H. Hart, Admx.
By their Attorney

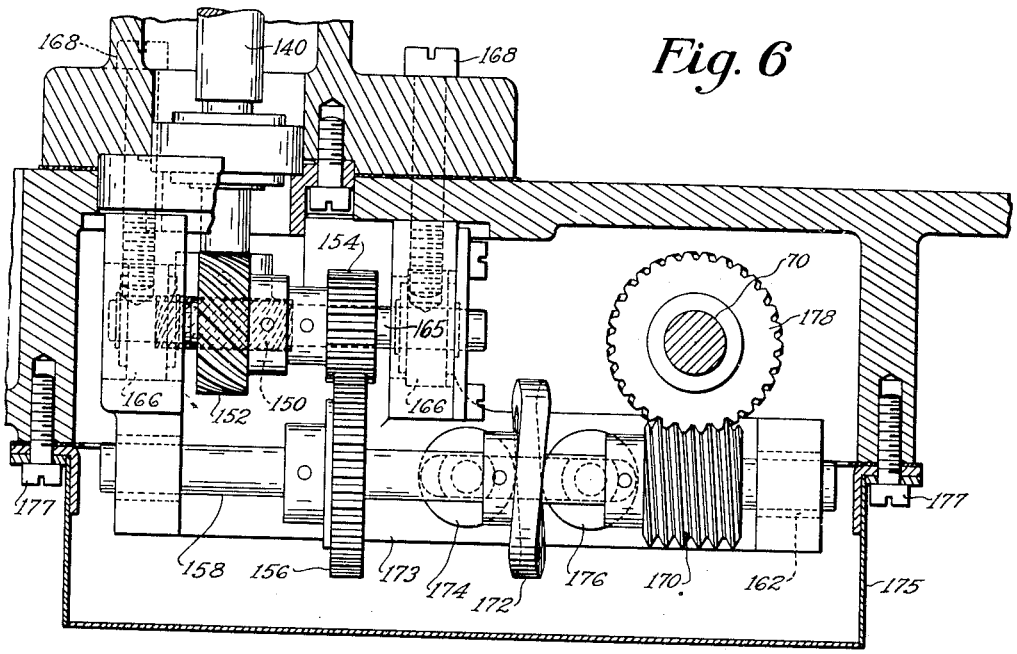
*Fig. 6*
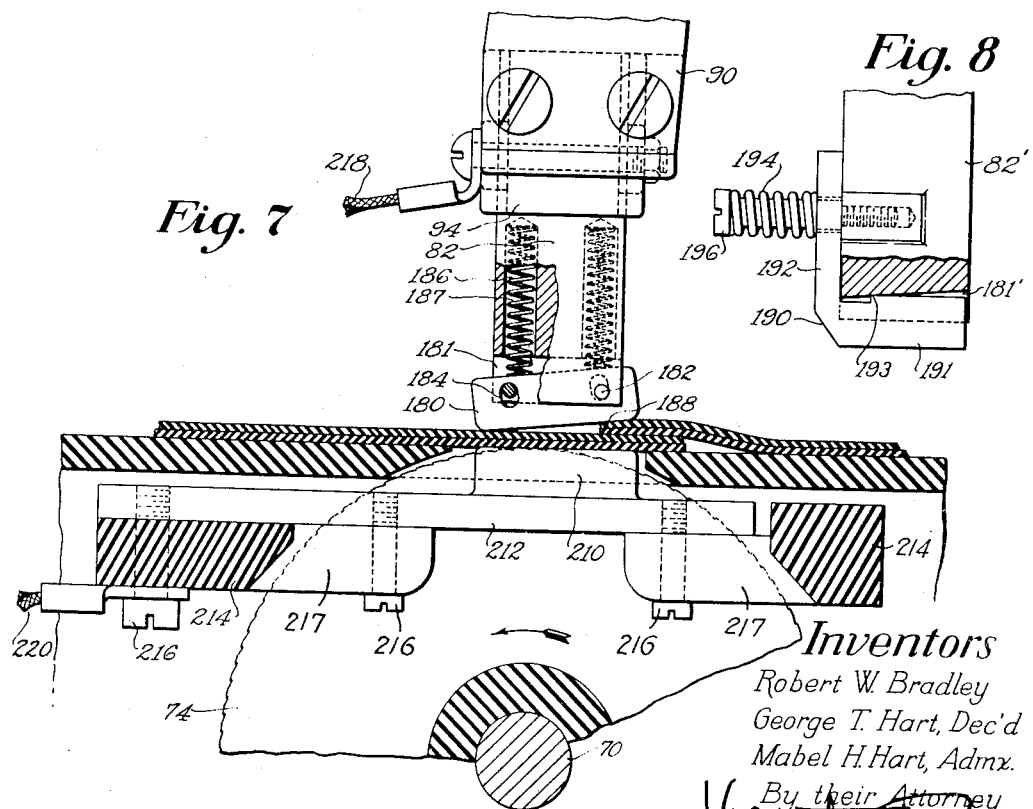
*Fig. 7*
*Fig. 8*
Inventors
Robert W. Bradley
George T. Hart, Dec'd
Mabel H. Hart, Admx.
By their Attorney United States Patent Office 2,727,560
Patented Dec. 20, 1955

2,727,560

APPARATUS FOR DIELECTRIC BONDING

Robert W. Bradley, Marblehead, Mass., and George T. Hart, deceased, late of Nahant, Mass., by Mabel H. Hart, administratrix, Nahant, Mass., assignors to United Shoe Machinery Corporation, Flemington, N. J., a corporation of New Jersey Original application July 8, 1948, Serial No. 37,568, now Patent No. 2,650,288, dated August 25, 1953. Divided and this application January 7, 1953, Serial No. 330,109

2 Claims. (Cl. 154—42)

This application, which is a division of our application Serial No. 37,568, filed July 8, 1948, now United States Patent No. 2,650,288, entitled "Dielectric Bonding Machine," relates generally to apparatus for bonding plies of thermoplastic material by subjecting them to a high-frequency electric field and pressure. More specifically, the invention relates to an improved arrangement for supporting the lower one of the two electrodes employed in the aforesaid apparatus.

In apparatus of the type disclosed herein, it is necessary for the feeding elements to engage the work at a location adjacent to the operating location of the electrodes. Since the work feeding elements are commonly at ground potential, while the lower electrode is at a high-radio frequency operating potential, it will readily be seen that such juxtaposition of elements may be a source of energy loss or other operational difficulty depending largely upon the amount of stray capacity between the electrode and the elements of the feeding mechanism.

Accordingly, it is an object of the present invention to provide an improved arrangement for supporting the lower electrode of a dielectric seam bonding apparatus in which the capacity between the electrode and feeding elements is minimized.

Another object of the invention is to provide an arrangement as aforesaid in which the electrode is mounted for convenient removal or replacement.

To these ends and in accordance with a feature of the invention, the herein disclosed bonding machine is provided with an electrode bridge spanning the space between supports disposed on diametrically opposite sides of a feed wheel, the bridge being removably secured to the supports.

These and other aspects and features of the invention will best be understood from a consideration of the following specification, taken in connection with the accompanying drawings, in which:

Fig. 1 is a front elevation of a progressive bonding machine embodying the invention;

Fig. 2 is a schematic diagram of the electrical circuit of the machine including electrodes, a transmission line, an oscillator, and a pulsing circuit;

Fig. 3 is a rear elevation, partly in section, of a portion of the machine shown in Fig. 1;

Fig. 3a is a left side elevation of a mounting for a transmission line, as indicated in Fig. 3;

Fig. 4 is an enlarged end elevation, partly in section, on line IV—IV of Fig. 3 showing the operating head, feed wheels and electrodes of the machine of Fig. 1, a cover over the head and portions of a rotary solenoid being removed to show the details of the electrode drive mechanism;

Fig. 5 is a front elevation, partly in section, of the parts shown in Fig. 4 on the same enlarged scale;

Fig. 6 is a greatly enlarged vertical section on line VI—VI of Fig. 3 showing a step-by-step work-feed mechanism;

Fig. 7 is a greatly enlarged section on line VII—VII of Fig. 5 with an upper feed wheel removed showing partly in section one form of an improved work-contacting electrode operating on work parts of exaggerated thickness;

Fig. 8 is a side elevation, partly in section of a modification of the electrode shown in Fig. 7.

Figure 9:
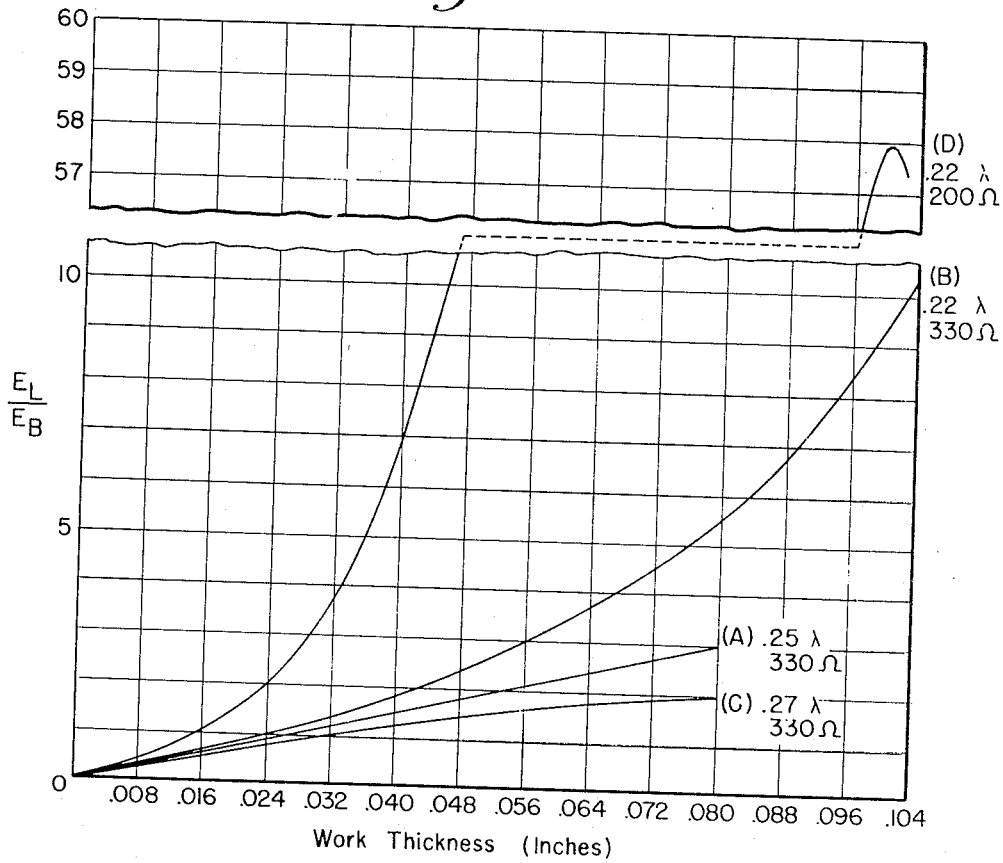
Fig. 9 is a graph of curves showing, as plotted against work thickness for various lengths of transmission line, the ratio of the electrode voltage to the high-frequency voltage at the input to a transmission line.

In the illustrated embodiment of this invention, our improved bonding machine has a frame 10 enclosed at the base by walls forming a cabinet 11. The frame supports a work table 12 and a bracket arm 14 extending over the work table. At the end of the arm 14 is an operating head 16 normally enclosed by a cover plate 18 attached thereto by bolts 20 engaging threaded holes 22 (Fig. 4) in the arm.

As seen conveniently in Fig. 3, the machine has, extending through the arm and journaled in bearings 24, 26, 28, a main drive shaft 30 having at one end a drive pulley 32 connected by a belt 34 to a suitable electric motor 36 mounted in the cabinet 10. A flexible coupling 25 on the shaft 30 permits adjustment of the relative positions of the upper electrode and the work feed mechanism. Control of the speed of the motor is provided by a conventional Thyratron motor control (not shown) mounted within the cabinet and operated by a treadle 40 (Fig. 1) in a control box 42 connected to the cabinet by a conductor cable. A pedal 41 operates to raise the feed wheels and upper electrode, as will be further described.

Referring now to Figs. 4 and 5, the upper work-contacting feed members are carried by a vertically disposed rod 44 journaled in bearings 46, 48 in the head. To hold the members against the work, the rod is urged downwardly by a spring 50 bearing upon a collar 52 attached to the rod. Secured to the bottom end of the rod is a bracket 53 having on one side thereof ears 54. On the other side of the bracket is a projection 56 to the edge of which is secured one end of a leg member 58 carrying at its lower end an inclined upper feed-wheel 59. Between the ears 54 is pivoted a hinge portion 60 to which is attached a second leg member 62 and a wheel 64. By virtue of its mounting, this second member and wheel may be swung upwardly and away from the electrode although they are normally secured in downward position by the engagement of a leaf spring 66 with a lug 68 integral with the hinge portion. Beneath the work table 12 and attached to a second shaft 70 journaled near one end in a bearing 72 in the frame is a lower feed-wheel 74 having two flanges 76 for engaging the work surface opposite the upper feed-wheels.

A second rod 80 carrying an upper electrode 82 is suitable in passages 84, 85 and urged downwardly by a spring 86 bearing on a collar 88. The electrode 82 is attached to the bottom of the rod by a slab of insulating material 90 which is screwed to brackets 92 and 94 respectively attached to the rod and the electrode.

The mechanism for operating the upper electrode to grip and release a work piece and for adjusting the lowermost limit of its gripping movement in accordance with the thickness of the workpiece is illustrated in Fig. 4. The mechanism includes a feeler embodied in upper feed wheels maintained in engagement with the upper work surface adjacent to the electrodes, and operating means for moving the upper electrode in its "stitching" cycle toward and from the lower electrode through a substantially predetermined range, said means being arranged for heightwise movement responsive to changes in the heightwise position of said feeler with changes in work thickness, whereby the position of the said range is varied towards or away from the lower electrode to maintain a constant work surface penetration and in general a constant relation between the electrode stitching movement and the surface of work of different thicknesses.

In the preferred embodiment, a cam 100 attached to and driven by the main shaft 30 is adapted to oscillate a lever 106 about a pin 108, the lever preferably being provided with a cam roll 102 on an arm 104 integral with the lever. A spring 116 has one of its ends anchored to the head of the machine and its other end connected to an arm 118 of the lever. Thus by its rotative urging of the lever, the spring keeps the cam roll 102 against the cam. The oscillatory motion of the lever is transmitted by parallel links 110 (Fig. 5) to one arm of a bifurcated bell crank 112 pivoted by a fulcrum pin 107 on an ear 120 secured to the presser wheel rod 44. The other end of the bell crank is connected to the electrode rod 80 by parallel links 114. When a change in the thickness of work under the presser wheel moves the fulcrum 107 of the bell crank heightwise toward or away from the work, it will be seen that the links 110, being disposed perpendicularly to the direction of such motion, are adapted to pivot at their connection with the lever to permit movement of the horizontal arm of the bell crank to and from the work without affecting its angular position. On the other hand, the entire motion of the fulcrum is transmitted to the electrode rod because links 114 provide no relative motion between the electrode rod and the bell crank in that direction. Since the amplitude of the oscillatory motion transmitted from the lever 106 to the electrode rod is substantially unchanged as the fulcrum of the bell crank is raised or lowered, the range of the up and down motion imparted to the electrode rod is accordingly raised and lowered. The maximum electrode separation is determined by the uppermost position of the presser rod 44 in which position the bracket 53 and the head 16 are in engagement.

When it is desired to free work parts held in the machine, a hand lever 122 on top of the head and pivotally attached to the rod 44 provides a means for raising the rod and thus also the electrode rod 80 by the cam action of the rear portion of the lever against the top of the head 16. The lever is shown in its down position in Figs. 4 and 5 and in its raised position in Fig. 3. A spring-loaded pin 123 yieldingly secures the lever from vibrating when it is in its down position. The wheels and electrode may also be raised electrically under the control of the pedal 41 (Fig. 1) on the control box 42. Pressure on the pedal causes an electric current from a source (not shown) to flow through conductors 124 to a rotary solenoid 126. A solenoid arm 128 connected to the fulcrum of the bell crank by a wire link 130 rotates, when the solenoid is energized, to raise the electrode and presser wheel assembly. A normally closed switch 132 is mounted in the head in such a position that it is actuated by a leaf spring 134 attached to the collar 52 on the presser wheel rod when the rod is raised a predetermined distance. The switch is connected through leads 136 to a conventional relay 137, indicated diagrammatically in Fig. 2. Actuation of the switch operates to cut off the high-voltage direct current supplied to the oscillator, and thus prevents the high-frequency electric power from being inadvertently applied to the electrodes while the work-feed wheels and electrodes are raised and the operator's hands may be near the electrodes while manipulating the work to bring it into operative position, for example.

Intermittent rotation of the lower work-feed wheel 74 for step-by-step feeding is provided by the mechanism illustrated in Fig. 6. Herein a gear 178 attached to the feed wheel shaft 70 is engaged by a worm 170 on a shaft 158 driven from the main drive shaft 30 through means including a vertical shaft 140, spiral gears 146, 148 (Fig. 3) at its upper end, spiral gears 150, 152 at its lower end connecting it to a jack shaft 165 in bearings 166, and spur gears 154, 156 between that shaft and the worm shaft 170. The shaft 158 is slidably journaled in its bearings 160, 162 and means are provided for causing the shaft, and hence the worm 170, to reciprocate as it revolves, thus causing the gear 178 and the feed wheel 74 to be rotated intermittently. In the preferred embodiment, such means are provided by a cam 172 on the shaft 158 and cam-engaging rolls 174, 176 attached to a web 173 forming part of the frame of the machine. As shown, these rolls engage opposite surfaces of the cam. A well 175 is adapted to contain lubricating oil for the mechanism.

In order to minimize arcing from the rear of the upper electrode to a work surface when an incoming edge 188 of material holds up the front of the electrode thus tending to leave a gap between the electrode and the lower work surface, an elongated rocking member 180 forms the work-engaging portion of the electrode. The member is supported elastically from the main portion to present a work-engaging surface which will rock longitudinally to bridge such a gap.

In the form shown in Fig. 7, this member is disposed in a central groove 181 in the main portion 82 of the electrode, being retained therein by pins 182 passing through the main portion 82 and through slots 184 in the member 180. Springs 186 disposed in holes 187 at the front and rear of the main portion yieldingly hold the member 180 at the ends of the slots so that the pins provide an abutment which has a predetermined angular relation to the path of movement of the main portion. As illustrated, the assumed position is normally parallel to the work surface and in its surfaceward position. The pressure of the electrode on the work during operation is normally sufficient to overcome the force of the springs, but if either end of the member 180 should be unsupported, this end will be urged toward the work surface by one of the springs 186. We have found that the yielding provided by the upward movement of the member in the groove may be advantageously in the order of 1/100 of an inch and that such yielding tends to smooth the impact of the electrode at high speeds.

In a modification illustrated in Fig. 8, an L-shaped member 190 is disposed with its bottom part 191 in a central groove 181' in a main portion 82' of the electrode. A leg portion 192 of the member is yieldingly held, against an abutment provided by the rear edge of the main portion, by a coil spring 194 held in place by a screw 196. It will be seen that when the electrode is pressed down upon an incoming edge at its front part, the member 190 will rock about its point of contact 193 with the top of the groove 181' against the force of the spring 194 and, when released, will return to a position parallel to the work support.

Claims to this feature have been presented in our copending application referred to above.

A lower electrode 210 is mounted between the flanges of the feed wheel 74 by attachment to a conductive bridge element 212. The element 212 is supported at each end upon a C-shaped support 214 of insulating material, screws 216 passing through blocks 217 forming opposite ends of the support 214 and into said element. One of the screws 216 serves to connect a conductor 220 leading from the high-ferquency energy supply system.

The support 214 is carried by a member 222 (Fig. 5) which is screwed to a plate 224 screwed to the bed so that the blocks 217 are located on opposite sides of the feed wheel 74.

High-frequency electric energy is supplied to the electrodes by the self-regulatory system illustrated in Figs. 2 and 3. The system comprises source means 240 comprising a relatively lightly loaded oscillator for generating high-frequency electric energy at a substantially constant voltage, control means 242 for controlling the source to generate such energy in pulses of predetermined duration and amplitude in timed relation to the movements of the upper electrode, and a transmission line 244 comprising two conductors 334, 336 preferably of copper tubing, connecting the source means to the electrodes.

The source means is illustrated, for example, as a conventional push-pull grounded-anode oscillator having triodes 250, 252 with grounded anodes 254, 256, filaments 258, 260 which are heated from a source of current (not shown) and which are connected to a cathode tank circuit 262, and grids 264, 266 connected to a grid resistor 268. The grid to cathode circuit is completed from the other end of resistor 268 by a lead 270, a grid-control switch tube 272, and a return lead 274 connected to the mid-point of the cathode tank circuit. Condensers 276, 278 and 280 serve to by-pass to ground any stray high-frequency current in this circuit. The lead 274 also supplies negative high voltage to the filaments from a power supply (indicated as a variable battery 282) through the normally open contacts of a relay 137 when these contacts are closed by the closure of the switch 132 (shown in Fig. 4). Such closure is indicated by a reading on a voltmeter 284 (Fig. 1) which is mounted at an angle to be clearly visible through a window in the cabinet 11 to an operator seated at the worktable. Suitable means (not shown) are provided for manually varying the supply of voltage by turning a knob 286 on the front of the cabinet.

During the time such high voltage is supplied to the oscillator, the latter is nevertheless prevented from oscillating when tube 272 is not conductive by a cut-off bias applied to the grids of the oscillator by a bias supply 288 through a resistor 290. It will be understood that when the tube 272 is made conductive, the grid-cathode circuit is effectively closed and the oscillator immediately starts to function, the voltage of the bias source appearing only across the resistor 290.

The conductivity of the tube 272 is controlled by the bias supplied to its grid 292 by the output of a one-shot multivibrator circuit comprising an interconnected pair of tubes 294, 296. The tube 294 of the pair is normally non-conducting by reason of the connection of its grid 298 to the negative side of a common cathode resistor 300 through a resistor 302, the voltage drop across resistor 300 due to the flow of tube current being thus applied as a negative bias. Tube 296 meanwhile is conductive since its grid 304 is at the potential of its cathode through connection thereto by a resistor 306. In this condition, which is stable, current flows from a voltage source 308 through the resistor 300, tube 296, its anode resistor 310, and a lead 312 back to the source. The voltage drop in the resistor 310 is applied as a biasing voltage to the tube 272 by a lead 314 connected to grid 292 and the lead 312 which is connected to the cathode 293.

Provision is made for applying positive pulses to the grid 298 in timed relation to the movement of the electrodes by means of a commutator 320 mounted on the main drive shaft 30. The commutator has a conductive segment 322 which intermittently connects the grid 298 to the positive side of the power supply 308 through contacts 323 and a condenser 324 which has a shunt resistor 326. When such a pulse is applied to the grid 298, conduction is immediately shifted from tube 296 to tube 294 in a manner well understood. The cutting-off of the tube 296 causes its anode to rise to the voltage of the lead 312 and, therefore, removes the negative bias imposed on tube 272, allowing the oscillator to oscillate. This condition is unstable and lasts only for a time depending on the time constant of a condenser 328, which connects the anode of tube 294 to the grid of tube 296, and the resistor 306. After this time, the stable condition is immediately restored and the oscillator is cut off.

Thus the oscillator is caused to deliver one pulse of energy each time the conductive segment 322 of the commutator passes under the contacts 323. The shunt resistor 326 is employed to discharge the condenser 324 sufficiently between pulses to transmit successive positive pulses to the grid 298. The value of the resistor 326 should be sufficiently high with respect to resistor 302 so that if the commutator should come to rest with its conductive segment 322 beneath the contacts 323 the voltage dividing network formed by the two resistors will impose a negative biasing voltage on the grid 298, thus preventing sustained operation of the oscillator.

The high-frequency energy pulses produced by the oscillator are tapped from the cathode-tank circuit 262 and fed to the input end of the transmission line 244 through blocking condensers 330 and 332. Because, in its physical embodiment shown in Fig. 3, one conductor 344 of the transmission line is longer than the other conductor 336, condensers 330 and 332 are employed to match the electrical lengths of the conductors. For this purpose condenser 330 is a variable condenser of a form (Fig. 3a) offering a minimum of inductive reactance at high frequencies, while condenser 332 is a fixed condenser of a form exhibiting considerable inductive reactance at such frequencies. When condenser 330 is properly adjusted, the lines are of the substantially equal electrical length. The output end of the transmission line is connected to the electrodes 82 and 210 by short leads 218 and 220 (Figs. 2 and 7), respectively.

Across the transmission line near its input end, another variable condenser 338 is connected. By adjusting this condenser, the electrical length of the line can be increased or decreased as is well known to those skilled in the art.

The advantages provided by the present invention may be seen more clearly by reference to Fig. 9. Herein the voltage ratio $$\frac{E_L}{E_B}$$

of the output or electrode voltage $E_L$ to the input voltage $E_B$ is plotted against work thickness for various lengths and various characteristic impedances of transmission line.

The constant-voltage source assumed by the cited equation is substantially provided in the illustrative machine by the connection of the transmission line 334 to the oscillator tank circuit at a point of low impedance as indicated in Fig. 2 wherein the connection points 330, 332, are close to the shorting bar of the oscillator tank circuit. The transmission line is thereby tightly coupled to the oscillator tank at a point of low impedance. It will be understood that the term "constant-voltage" as here applied to a source implies that the voltage of the source does not change with changes in loading but does not imply that the voltage of the source may not be adjusted.

Taking, for example, curve A of Fig. 9 which represents the ratio of electrode voltage to input voltage at different thicknesses under operating conditions such that the transmission line has an electrical length of one-quarter wavelength at the operating frequency and a characteristic impedance of 330 ohms, it may be noted that this is a straight line passing through the origin. Assuming a fixed voltage input $E_B$ to the transmission line, it may be readily seen, therefore, that as the work thickness doubles, say from .016 inch to .032 inch, the electrode voltage $E_L$ likewise doubles. Further, this relation of proportional increase of voltage with thickness is maintained throughout the entire range of thickness.

On the other hand, curves B and C, which represent respectively the voltage ratio under operating conditions wherein the transmission lines are respectively shorter than and longer than an exact one-quarter wavelength at the operating frequency, show that for these lengths of transmission line the voltage ratio changes non-linearly with changes in work thickness, the shorter length line having a rising characteristic, and vice versa. Hence, while the electrode voltage still tends to increase with thickness, it does so progressively more abruptly in the one case and progressively more slowly in the other. As stated above, there is a relatively greater heat loss with thinner work, as in bonding most plastic sheeting, so that a curve of type C form may be preferred. The behavior of a transmission line is also affected by its characteristic impedance in a predictable manner as may be seen by comparing, for example, curve B with curve D. Another thing to be noted from the cited equation is that, in general, these curves are also identical to the curves of transmission lines which are longer at the operating frequency than the specified lengths by any multiple of a half-wave length. For example, curve A is also the characteristic curve for a transmission line having a characteristic impedance of 330 ohms and a length of any odd quarter wavelength.

An inspection of the curves of Fig. 9 shows that a slight departure from an exact odd quarter wavelength effects a considerable change from a straight line electrode voltage change with thickness.

Thus, except where a declining rate of change is desired, the advantageous electrical length of the transmission line at the operating frequency will evidently be in the neighborhood of an odd quarter wavelength where the impedance of the transmission line at the electrodes is substantially at a maximum.

In operation, after an initial "warm-up," the operator raises the upper electrode and presser wheel assembly, for example, by actuating pedal 41, inserts the work parts to be bonded in proper position, and lowers the assembly. Having set knob 286 to the proper base voltage for the material, he is then free to control, by treadle 40, the rate of feed of the work parts through the machine to suit his requirements without regard to changes in work thickness.

Although this invention is described as embodied in a particular apparatus, it will be understood that, since many changes may be made in the arrangement, disposition and form of the parts without departing from the principles of the present invention, the apparatus shown and described is merely illustrative, and the invention is to be determined by the broadest construction of the terms of the claims which is permitted by the prior art.

Having thus described the invention, what is claimed as new and desired to be secured by Letters Patent of the United States is:

1. In an electronic seaming machine, a bed providing a work-support having an apertured portion, a driven feed wheel positioned within the bed but having a peripheral portion thereof extending through said apertured portion, a lower electrode assembly comprising spaced supports of insulating material disposed on diametrically opposite sides of said feed wheel, and an electrode bridge spanning the space between and having end portions removably secured to said supports.

2. In an electronic seaming machine, a bed providing a work-support having an apertured portion, two driven feed wheels positioned within the bed and each having a peripheral portion thereof extending through said apertured portion, a lower electrode assembly comprising spaced supports of insulating material disposed on diametrically opposite sides of said feed wheels, and an electrode bridge disposed between said feed wheels and spanning the space between said supports, said bridge having end portions removably secured to said supports.

References Cited in the file of this patent

UNITED STATES PATENTS

| | | |
|---|---|---|
| 2,432,412 | Hacklander | Dec. 9, 1947 |
| 2,458,563 | Collins | Jan. 11, 1949 |
| 2,525,356 | Hoyler | Oct. 10, 1950 |
| 2,563,098 | Brown | Aug. 7, 1951 |
| 2,572,226 | Walstrom | Oct. 23, 1951 |
| 2,650,288 | Bradley et al. | Aug. 25, 1953 |

OTHER REFERENCES

Singer Electronic Seamer 248–2. Copyright 1946 by the Singer Manufacturing Co.